United States Patent [19]

Mercer et al.

[11] E Re. 29,359

[45] Reissued Aug. 16, 1977

[54] BRONCHODILATOR EXPECTORANT COMPOSITION CONTAINING THEOPHYLLINE AND A GUAIACOL

[75] Inventors: Neil H. Mercer; Robert J. Bequette, both of Evansville, Ind.

[73] Assignee: Mead Johnson & Company, Evansville, Ind.

[21] Appl. No.: 709,569

[22] Filed: July 28, 1976

Related U.S. Patent Documents

Reissue of:

[64] Patent No.: 3,109,773
Issued: Nov. 5, 1963
Appl. No.: 147,436
Filed: Oct. 25, 1961

[51] Int. Cl.[2] ..... A61K 31/52; A61K 31/09

[52] U.S. Cl. ..... 424/253; 424/341

[58] Field of Search ..... 424/253

[56] References Cited

OTHER PUBLICATIONS

Chem. Abst., vol. 32, p. 2914[4], 1938.

*Primary Examiner*—Sam Rosen
*Attorney, Agent, or Firm*—R. E. Carnahan; R. H. Uloth

[57] ABSTRACT

*Palatable liquid pharmaceutical compositions containing theophylline and guaiacol or other water soluble form thereof such as glyceryl guaiacolate. The latter have a solubilizing effect on theophylline making possible concentrations of theophylline in solution in excess of the saturated solution value in the absence of said solubilizing agents.*

12 Claims, No Drawings

BRONCHODILATOR EXPECTORANT COMPOSITION CONTAINING THEOPHYLLINE AND A GUAIACOL

Matter enclosed in heavy brackets [ ] appears in the original patent but forms no part of this reissue specification; matter printed in italics indicates the additions made by reissue.

The present invention is concerned with improved liquid pharmaceutical compositions of theophyline. These novel compositions contain guaiacol or a water soluble form thereof such as glyceryl guaiacolate which serves to solubilize the theophylline making possible highly concentrated liquid dosage forms thereof. As is well known, guaiacol and its derivatives are useful as expectorants. The function thereof as solubilizing agents in the present compositions does not interfere with their desired expectorant action. Novel bronchodilator expectorant compositions are thus provided.

Theophylline has long been recognized as an effective agent in the treatment of bronchospastic disorders, to promote diuresia, and in congestive heart failure, in view of its bronchodilator, diuretic, analeptic, cardiac stimulant and coronary dilator activity. It is administered orally, intravenouly, intramuscularly, and rectally. There are, however, well-known hazards attendant upon intravenous administration and the use of rectal suppositories. Intramuscular injection of theophylline is painful.

When given orally theophylline often displays an irregular absorption pattern. Furthermore, it is an irritating substance and frequently results in abdominal discomfort, nausea, and vomiting. It is frequently difficult to orally administer a sufficiently large dose of the agent to provide the expected therapeutic effect. There is thus a clinical need for an oral dosage form that has improved gastro-intestinal tolerance and produces prompt effective concentrations of theophylline in the blood.

Prior attempts to overcome the above problems have involved the formation of salts and chemical associations of theophylline with other materials, such as chloine, aluminum hydroxide, ethyl p-aminobenzoate, sodium salicylate, methyl glucamine, ethanolamine, piperazine, calcium salicylate sodium acetate, sodium glycinate, 1 amino-2-propanol, ethylenediamine, etc. None of these has provided a satisfactory solution to the problem. While some have satisfactory solubilities in alkaline solution, precipitation of the theophylline under acidic conditions, such as are encountered in the stomach, frequently occurs, thus presenting the drug in less favorable form for gastric absorption.

More recently elixirs of theophylline have been introduced which appear to offer an improvement, since better gastric tolerance, as well as more prompt and adequate absorption of the theophylline occurs. Unfortunately the high concentration of alcohol and the relatively low concentration of theophylline in such preparations leave unsolved problems of administration, particularly for children and for those unwilling or unable to ingest significant amounts of alcohol.

It is one object, therefore, of the present invention to provide an improved liquid theophylline dosage form having a sufficiently high concentration of theophylline, reduced alcohol concentration, and acceptable palatability to permit the administration of a therapeutic dose of theophylline in a relatively small volume, thus the possibility of inebriation, gastric intolerance, and generally increasing patient acceptance. Another object is to provide a liquid theophylline composition having solution stability over a wide pH range, particularly under acidic pH conditions. A further object is to provide a theophylline expectorant containing solution. These and other objects will be apparent from the following disclosure.

The maximum solubility of theophylline in water at room temperature is 0.83 g./100 ml. It has been found that guaiacol and water soluble forms thereof have a solubilizing effect on theophylline, making it possible to prepare aqueous solutions of theophylline having concentrations in excess of 0.83 g./100 ml. and as high as 4.0 g./100 ml. Guaiacol itself, glyceryl guaiacolate, potassium guaiacol sulfonate, and the hemiacetal condensation product of guaiacol and alloxan are examples of suitable water soluble forms of guaiacol that may serve as solubilizing agents. These particular forms of guaiacol each have water solubilities of 1.7 g./100 ml. of greater. The term water soluble is intended to refer to solubilities of such magnitude and greater.

Glyceryl guaiacolate is, however, the preferred form of guaiacol because of its greater water solubility, its pharmaceutical elegance, and its expectorant quality. The latter is not diminished by the presence of the theophylline. For administration to asthmatic patients an expectorant is highly desirable since it facilitates removal of the thick, tenacious mucus and appears to cut down on the formation thereof also.

The present compositions are unique not only in the high concentration of theophylline obtained in solution, but also because of the solution stability thereof over a wide pH range. A disadvantage of many prior forms of theophylline such as aminophylline, an example of a widely used form, which have relatively high solubilities in alkaline solution (in excess of pH 8.0), is that under acidic conditions such as occur in the stomach, precipitation often occurs. The theophylline of the present compositions, however, remain in solution over a wide range of pH values including strongly acid solutions having pH less than 1, neutral solution, and those high in the alkaline range.

A concentration in solution of glyceryl guaiacolate of 0.75 g./100 ml. has a demonstrable solubilizing effect, making it possible to prepare aqueous solutions of theophylline having a concentration of 1 g. or more per 100 ml. For the preparation of more concentrated theophylline solutions, proportionately higher amounts of glyceryl guaiacolate up to 7.64 g. per 100 ml. of water are employed, this amount adequately solubilizing up to 4.37 g. of theophylline per 100 ml. of water employed in the composition at room temperature. It is apparent that reciprocal solubilization of the glyceryl guaiacolate occurs since a saturated solution thereof in water at 25° C. contains only 5 g./100 ml.

Reciprocal solubilization of guaiacol in the present compositions is also observed. A saturated solution thereof in water at room temperature and in the absence of other solutes has a concentration of 1.7 g./100 ml. However 4.05 g. thereof will dissolve in 100 ml. of water when it acts to solubilize 4.37 g. of theophylline therein. For the preparation of more dilute theophylline solutions, less guaiacol is employed in proportionate amount as desired, 0.47 g. thereof being sufficient to prepare a solution containing 0.85 g. of theophylline per 100 ml., an amount exceeding the saturated solution concentration.

The present discovery is applicable to the compounding of and is embodied chiefly in liquid pharmaceutical compositions adapted for oral administration according to the present invention. Since such compositions are ordinarily stored at room temperature or below, the maximum solution concentration of theophylline obtainable at room temperature with the various solubilizing agents has been selected as the preferred upper concentration limit of theophylline in the compositions claimed herein. Nevertheless, if the temperature is increased, higher theophylline concentrations may be achieved in accordance with usual practice in solution manufacture. Advantage of this phenomenon is taken in manufacturing the present compositions as will be apparent from the following disclosure. At 60° C. a theophylline solution having a concentration of 8 g./100 ml. can be prepared and higher concentrations are attainable at higher temperatures.

A wide variety of additional pharmaecutically acceptable ingredients may be employed in the present aqueous theophylline compositions. It has been found that even highly water soluble ingredients such as sucrose, sorbitol, glycerol, and ethanol do not tend to diminish the solubility of the theophylline significantly when solubilized by guaiacol and its water soluble derivatives according to the present invention. Up to about 80 g./100 ml. of final solution volume of such ingredients other than the theophylline, guaiacol component, and water may be employed as long as the complete composition contains at least 40% by volume of water.

As a matter of fact, some such solutes actually make possible the preparation of theophylline solutions having somewhat higher concentrations or employing less guaiacol solubilizing agent as defined herein than is ordinarily necessary for simple aqueous solutions. Ethanol is an example of such solute. The solubility of theophylline in ethanol, of course, is somewhat greater than its solubility in water, 1.25 g./100 ml. being the published figure. Proportions of ethanol greater than about 20% by volume are not pharmaceutically acceptable for present purposes, so the additive solubility effect of ethanol alone is not sufficient for preparation of the compositions disclosed and claimed herein. Preferred compositions of the present invention, however, contain up to about 20%, and preferably 15% by volume of ethanol because it is thought to assist in the absorption of the theophylline from the gastro-intestinal tract.

Various sweetening and flavoring agents are preferably employed in preparing oral dosage forms of the present type. Sugar syrup has been found to be a particularly satisfactory vehicle. It has been found that 80 g. per 100 ml. of solution of sucrose may be employed in preparing aqueous compositions of the present type having concentrations of 4 g. of glyceryl guaiacolate and 2.0 g. of theophylline per 100 ml. The resulting compositions has a specific gravity of about 1.32 and contains 46% by volume of water and 8.7 g. of glyceryl guaiacolate and 4.4 g. of theophylline per 100 ml. of water in said composition. It is apparent, therefore, that sucrose has a supplementary solubilizing action making possible solutions having somewhat higher concentrations of theophylline and glyceryl guaiacolate than is possible in simple aqueous solution.

In summary, the final composition should contain at least about 40% water by volume, greater than 0.83 g. and up to 4.37 g. of theophylline per 100 ml. of water in the composition, and a solubilizing agent selected from 0.75 to 7.64 g. of glyceryl guaiacolate, or 0.47 g. to 4.05 g. of guaiacol per 100 ml. of water in the composition. Sufficient amounts of potassium guaiacol sulfonate, guaiacol-alloxan compound, or other water soluble pharmaceutically acceptable form of guaiacol to solubilize the theophylline may be substituted for glyceryl guaiacolate or quaiacol.

In terms of a 5 ml. dosage unit thereof, preferred compositions contain at least 2 ml. of water, from 16.6 to 175 mg. of theophylline, and from 15 to 350 mg. of glyceryl guaiacolate, and suitable bodying flavoring, and coloring agents as required to provide a pharmaceutically elegant product. Sugar syrup is an excellent vehicle, and it will be shown in the examples which follow that up to forty fold the amount of sucrose as theophylline on a dry weight basis can be employed satisfactorily in such composition.

EXAMPLE 1

GLYCERYL GUAIACOLATE AS SOLUBILIZING AGENT

Varying quantities of theophylline and glyceryl guaiacolate are mixed and warmed with sufficient water to provide 100 mll. of solution. The solutions are cooled, adjusted to 100 ml. volume, and kept for 3 days to allow crystallization to take place. The specific gravities of the fresh solutions are measured, and the amount of water contained in 100 ml. of solution calculated. Two identifical tubes of each composition are prepared. One is kept at room temperature (25° C.) and the other at 0° C.

The results observed after the storage period are arranged in the following table. These results confirm that a concentration of 0.85 g./100 ml. exceeds the normal solubility of theophylline. A larger quantity of theophylline, 1.0 g./100 ml., will, however, dissolve when 0.75 g. of glyceryl guaiacolate per 100 ml. is also present in solution. Up to 4.0 g. of theophylline per 100 ml. of solution is soluble at room temperature when 7.0 g. of glyceryl guaiacolate per 100 ml. of solution is employed. Crystallization at ice temperature does, however, occur. On the basis of the water content the solubility ratios in the latter case are 4.37 g. of theophylline and 7.64 g. of glyceryl guaiacolate per 100 ml. of water.

Precipitate-free solutions of theophylline at room temperature having concentrations thereof from 0.83 g. to 4.37 g. of theophylline per 100 ml. of water are thus prepared employing graded amounts of glyceryl guaiacolate as a solubilizing agent, ranging from 0.75 g. to 7.64 g. thereof per 100 ml. of water in the composition. The preferred range, however, is from 0.83 to 3.18 g. of theophylline per 100 ml. of water and from 0.75 to 4.23 g. of glyceryl guaiacolate per 100 ml. of water since such solutions are precipitate-free even at 0° C.

Example 1.

Solubilities in Water

| Theophylline (g.) | | Glyceryl Gualicolate (g.) | | Water (ml.) per 100 ml. | Temp. | |
|---|---|---|---|---|---|---|
| (1) | (2) | (1) | (2) | Solution | (° C) | Result |
| 0.83 | 0.83 | 0 | 0 | 100 | 25 | Clear Solution |
| 0.85 | 0.85 | 0 | 0 | 100 | 0 | Crystals formed. |
| | | | | | 25 | " |
| 1.25 | | 0 | | | 0 | " |
| 1.00 | 1.00 | 0.50 | 0.50 | 100 | 0 | " |
| | | | | | 25 | " |
| 1.00 | 1.00 | 0.75 | 0.75 | 100 | 0 | " |

Example 1.-continued

| Solubilities in Water | | | | | | |
|---|---|---|---|---|---|---|
| Theophylline (g.) | | Glyceryl Gualicolate (g.) | | Water (ml.) per 100 ml. | Temp. | |
| (1) | (2) | (1) | (2) | Solution | (° C) | Result |
| | | | | | 25 | Solution clear. |
| 1.00 | 1.01 | 1.00 | 1.01 | 98.6 | 0 | " |
| | | | | | 25 | " |
| 1.00 | 1.01 | 2.00 | 2.05 | 97.6 | 0 | " |
| | | | | | 25 | " |
| 1.00 | 1.03 | 3.00 | 3.10 | 96.8 | 0 | " |
| | | | | | 25 | " |
| 1.00 | 1.04 | 4.00 | 4.17 | 96.0 | 0 | " |
| | | | | | 25 | " |
| 1.00 | 1.05 | 5.00 | 5.25 | 95.2 | 0 | " |
| | | | | | 25 | " |
| 2.50 | 2.64 | 4.00 | 4.22 | 94.9 | 0 | " |
| | | | | | 25 | " |
| 3.00 | 3.18 | 4.00 | 4.23 | 94.5 | 0 | " |
| | | | | | 25 | " |
| 3.50 | 3.72 | 4.00 | 4.25 | 94.1 | 0 | Crystals formed. |
| | | | | | 25 | " |
| 3.50 | 3.75 | 5.00 | 5.35 | 93.4 | 0 | " |
| | | | | | 25 | Clear solution. |
| 2.50 | 2.68 | 5.00 | 5.31 | 94.1 | 0 | " |
| | | | | | 25 | " |
| 4.00 | 4.37 | 7.00 | 7.64 | 91.6 | 0 | Crystals formed. |
| | | | | | 25 | Clear solution. |

(1) per 100 ml. of solution.
(2) per 100 ml. of water in solution.

EXAMPLE 2

GUAIACOL AS SOLUBILIZING AGENT

In order to test the effectiveness of guaiacol as a solubilizing agent for theophylline in water, an experiment corresponding to the last entry in the table accompanying Example 1 is conducted. Theophylline, 4.0 g., and guaiacol, 4.39 g. (an amount equivalent on a molecular basis to 7.0 g. of glyceryl guaiacolate as employed in Example 1), are dissolved in water as indicated in Example 1 and the resulting solution stored in the same fashion. A clear solution does not result in this particular instance. A haze forms as the result of liquefaction of the guaiacol without complete solution thereof. When the amount of guaiacol is reduced to 3.8 g., however, a clear solution results from which no crystals separate on 3 days' storage at either room temperature or 0° C.

Since the approximate specific gravity of the above solution is 1.016, the useful upper guaiacol solubility ratio is, therefore, about 4.05 g. per 100 ml. of water in the composition. This amount will solubilize up to and including 4.25 g. of theophylline per 100 ml. of water in the composition. For lower theophylline concentrations, proportionately less guaiacol may be used, 0.47 g. thereof per 100 ml. being sufficient to solubilize 0.85 g. of theophylline per 100 ml.

EXAMPLE 3

POTASSIUM GUAIACOL SULFONATE AS SOLUBILIZING AGENT

An experiment similar to that of Example 2 is conducted to test the ability of potassium guaiacol sulfonate to solubilize theophylline. An aqueous solution of 8.56 g. of potassium guaiacol sulfonate (equivalent on a molecular basis to 7.0 g. of glyceryl guaiacolate) and 4.0 g. of theophylline in 100 ml. is prepared. Crystallization from this solution occurs both at room temperature and at 0° C. on storage. The amount of potassium guaiacol sulfonate is then reduced to 4.28 g. per 100 ml. and the amount of theophylline to 2 g. per 100 ml. in a second run. Crystallization from this solution occurs at 0° C., but at room temperature only very slight separation of solid material occurs, indicating that the potassium guaiacol sulfonate indeed has a demonstrable solubilizing effect, albeit a lesser one than exhibited by either guaiacol or glyceryl guaiacolate. In a third run maintaining the potassium guaiacol sulfonate concentration at 4.28 g./100 ml. but reducing the theophylline to 1.5 g./100 ml., a clear solution results which is stable for at least 3 days at room temperature. Slight crystallization occurs at ice temperature.

EXAMPLE 4

FLAVORED COMPOSITION

Distilled water, 18.75 l. is heated to 60° C. and the following materials dissolved in it: sodium saccharin, 50 g.; 70% aqueous sorbitol, 2.5 l.; sodium cyclamate, 300 g.; citric acid, 200 g.; sodium citrate, 150 g.; glyceryl guaiacolate, 300 g.; theophylline, 500 g.; sucrose, 25 kg. The solution is then allowed to cool to 35° C. and the following materials are dissolved therein: methyl p-hydroxybenzoate, 60 g.; propyl p-hydroxybenzoate, 15 g.; ethyl vanillin, 10.0 g.; grenadine flavor, 4.0 ml.; menthol, 0.3 ml.; alcohol U.S.P., 7.91 l. F.D. & C. Yellow No. 5. 3.0 g., was dissolved in 150 ml. of distilled water and added to this solution. The solution was then diluted to 50 l., clarified by filtration, and transferred to bottles of appropriate size.

This procedure is more conveniently arranged for large scale manufacture if separate solutions of the glyceryl guaiacolate and theophylline on the one hard and the sucrose on the other are first prepared and mixed. The above procedure may be thus adapted by dissolving the amounts of theophylline and glyceryl guaiacolate specified in 5 l. of water at a temperature of 57–60° C. and the sucrose in 18 l. of water at 57–60° C. These solutions are then mixed at the temperature and allowed to cool. While they are cooling the sodium saccharin, sodium cyclamate, sorbitol, citric acid, and sodium citrate are added thereto and allowed to dissolve. A solution of the methyl p-hydroxybenzoate, propyl p-hydroxybenzoate, ethyl vanillin, menthol, and the grenadine flavor in the alcohol called for by the formula is prepared. This solution is added to the aqueous solution of the other ingredients described after it has cooled to 37° C. The color (F.D. & C. Yellow No. 5) is then dissolved in approximately 150 ml. of water, as indicated above, and added to the mixture which is then diluted to volume, filtered, and subdivided.

The efficacy and acceptability of this preparation (Example 4) was studied in 59 children and 56 adults suffering from obstructive pulmonary disease, mainly bronchial asthma. The adults received a dose of two tablespoonfuls three times a day and children six to twelve years old, one tablespoonful three times a day. Children less than six years of age were administered adjusted doses three times daily of ½ teaspoonful per 10 lbs. of body weight. Good to excellent relief was obtained in these patients and side effects, such as gastric irritation, were minimum and judged to be of lesser incidence and magnitude than with other theophylline preparations.

Theophylline blood concentrations were measured in five of the children and six of the adults to whom the above dosage of the composition of Example 4 was administered. Blood levels of 5 mcg./ml. or greater were observed in each instance within 15 to 30 minutes after administration of the dose. These blood levels remained for from 4 to 6 hours. A blood concentration of 5 mcg./ml. of theophylline is accepted by the art as a therapeutic concentration.

The recommended dosage of this composition for adults is the same as that employed with other theophylline preparations, namely 150 to 300 mg. of theophylline two to three times daily, that is from 1 to 2 tablespoonfuls of the composition of Example 4 two to three times per day. For children six to twelve years of age, one-half the above dose is employed. For children under six the recommended dosage is 5 mg./kg. of body weight of theophylline which corresponds to ½ teaspoonful per 10 lbs. of body weight of the composition of Example 4. This dosage may be administered two to three times daily. In cases of acute attacks the above dosages may be increased by 50%.

EXAMPLE 5

SUCROSE AS SUPPLEMENTARY SOLUBILIZING AGENT

Solutions containing varying quantities of theophylline, glyceryl guaiacolate, and sucrose according to the figures arranged in the following table are prepared. The ingredients are warmed to about 60° C. to effect solution and the solutions are then kept at room temperature to observe whether crystallization occurs. The results observed in conducting this experiment are summarized in the table. Sucrose is taken as representative of the total of all other water soluble pharmaceutically acceptable ingredients that may be used in formulating the present compositions for the purposes of this experiment. It is apparent, of course, that the actual weight of flavors, colors, and other ingredients that will ordinarily be used for the purpose of creating pharmaceutical elegance will be relatively minor and that sucrose or equivalent material such as corn syrup or sorbitol is the only ingredient of this type which will ordinarily be used in substantial quantity.

Example 5.

Sucrose Solution Preparation and Storage

| | Ingredients | | | | | | |
|---|---|---|---|---|---|---|---|
| | Theophylline (g.) | | Glyceryl Guaiacolate (g.) | | Vehicle composition per 100 ml. of Solution | | |
| | (1) | (2) | (1) | (2) | Sucrose (g.) | Water (ml.) | Results* |
| a | 2 | 3.4 | 4 | 6.8 | 60 | 59 | Clear solution. |
| b | 2 | 3.9 | 4 | 7.7 | 70 | 52 | " |
| c | 2 | 4.4 | 4 | 8.7 | 80 | 46 | " |
| d | 3 | 5.9 | 4 | 7.8 | 70 | 51 | Characteristic theophyline crystals. |
| e | 3 | 6.8 | 4 | 9.1 | 80 | 44 | Crystals formed on cooling. |
| f | 3 | 7.5 | 4 | 10.0 | 85 | 40 | " |
| g | 3 | 8.1 | 4 | 10.8 | 90 | 37 | " |
| h | 4 | 9.3 | 5.3 | 12.4 | 80 | 43 | " |

(1) per 100 ml. of solution.
(2) per 100 ml. of water in solution.
*Appearance of duplicate samples after being stored separately at 26° C. and at 0° C. for 3 days.

Comparison of the theophylline and glyceryl guaiacolate concentrations in the compositions of Example 5 on the basis of the water content thereof with the compositions of Example 1 in which no solute other than the theophylline and glyceryl guaiacolate was employed, lends further support to the upper concentration limits defined by Example 1. As a matter of fact the compositions of Example 5 illustrate how the upper limit may be extended upwardly somewhat when substantial amounts of sucrose are employed. For example, the last entry in the table in Example 1 is for an aqueous solution of 4.37 g. of theophylline and 7.64 g. of glyceryl guaiacolate per 100 ml. of water contained therein. Slight crystallization from this solution occurred at ice temperature, but not at room temperature. [Compositions *a*, *b*, and] *Composition* c of Example 5 [contain] *contains a* somewhat higher [concentrations] *concentration* of these two solutes, considering the water [contents] *content* thereof, and crystallization from [these solutions] *this solution* did not occur at room temperature or at ice temperature. Thus, when employing up to 80 g. of sucrose per 100 ml. of final composition volume the theophylline and glyceryl guaiacolate concentration limits may be expanded upwardly at least to 4.4 g. theophylline and 8.7 g. of glyceryl guaiacolate per 100 ml. of water in said composition.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A pharmaceutical composition comprised of at least about 40% by volume of water having dissolved therein at room temperature more than 0.83 g. of theophylline per 100 ml. of water contained therein, and a solubilizing agent selected from the group consisting of guaiacol and pharmaceutically acceptable water soluble forms thereof in amount sufficient to maintain said theophylline in solution[.] , *wherein a greater amount of theophylline is dissolved at room temperature than the amount thereof which is soluble in the composition in the absence of said solubilizing agent, and wherein the greater amount of theophylline dissolved is made possible by the solubilizing agent.*

2. The composition of claim 1 containing up to 4.37 g. of theophylline per 100 ml. of water contained therein.

3. The composition of claim 1 wherein said solubilizing agent is glyceryl guaiacolate.

4. The composition of claim 1 containing glyceryl guaiacolate as said solubilizing agent in an amount of from 0.75 to 7.64 g. per 100 ml. of water contained therein.

5. The composition of claim 1 wherein said solubilizing agent is guaiacol.

6. The composition of claim 1 containing guaiacol as said solubilizing agent in an amount of from 0.47 to 4.05 g. per 100 ml. of water contained therein.

7. The composition of claim 1 containing up to 20% by volume of ethanol.

8. The composition of claim 1 containing sucrose as supplementary solubilizing and sweetening agent.

9. A pharmaceutical composition comprised of at least about 40% by volume of water having dissolved therein more than 0.83 and up to 4.37 g. of theophylline and from 0.75 to 7.64 g. of glyceryl guaiacolate per 100 ml. of water contained therein[.] , *wherein a greater amount of theophylline is dissolved at room temperature than the amount thereof which is soluble in the composition in the absence of said glyceryl guaiacolate, and wherein the greater amount of theophylline dissolved is made possible by the glyceryl guaiacolate.*

10. A pharmaecutical composition comprised of at least about 40% by volume of water having dissolved therein more than 0.83 and up to 3.18 g. of theophylline and from 0.75 to 4.23 g. of glyceryl guaiacolate per 100 ml. of water contained therein[.] , *wherein a greater amount of theophylline is dissolved at room temperature than the amount thereof which is soluble in the composition in the absence of glyceryl guaiacolate, and wherein the greater amount of theophylline dissolved is made possible by the glyceryl guaiacolate.*

11. The composition of claim 10 containing 50 mg. of theophylline, 30 mg. of glyceryl guaiacolate, 2.4 ml. of water, 0.79 ml. of ethanol U.S.P., 2.5 g. of sucrose, and sufficient flavoring agents and preservatives to provide a pharmaceutically elegant oral dosage form.

12. A liquid theophylline composition comprising in each 5 ml. dosage unit thereof at least 2.0 ml. of water and from 16.6 to 175 mg. of theophylline, and from 7.5 to 350 mg. of glyceryl guaiacolate, and sufficent additional pharmaceutically acceptable ingredients to provide a pharmaceutically elegant oral dosage form[.], *wherein a greater amount of theophylline is dissolved at room temperature than the amount thereof which is soluble in the composition in the absence of glyceryl guaiacolate, and wherein the greater amount of theophylline dissolved is made possible by the glyceryl guaiacolate.*

* * * * *